United States Patent [19]

Singleton

[11] 3,950,280

[45] Apr. 13, 1976

[54] THERMOPLASTIC CAN END SEALANT COMPOSITION

[75] Inventor: Henry M. Singleton, Dallas, Tex.

[73] Assignee: The Southland Corporation, Dallas, Tex.

[22] Filed: July 16, 1973

[21] Appl. No.: 379,312

[52] U.S. Cl.............. 260/4 R; 260/5; 260/23.7 R; 260/23.7 B; 260/23.7 C; 260/23.7 M; 260/28.5 R; 260/28.5 B; 260/42.47; 260/887; 260/888; 260/894
[51] Int. Cl.$^2$...................... C08L 7/00; C08L 9/00
[58] Field of Search.......... 260/4, 5, 28.5 R, 28.5 B, 260/23.7 R, 23.7 B, 23.7 M, 23.7 C, 887, 888, 894, 42.47

[56] References Cited
UNITED STATES PATENTS

| 2,955,103 | 10/1960 | Baldwin et al. | 260/85.3 |
|---|---|---|---|
| 3,396,134 | 8/1968 | Cox | 260/28.5 B |
| 3,409,567 | 11/1968 | Dinsdale et al. | 260/28.5 B |
| 3,554,940 | 1/1971 | Arakawa et al. | 260/4 R |

Primary Examiner—Murray Tillman
Assistant Examiner—J. Ziegler
Attorney, Agent, or Firm—Cushman, Darby & Cushman

[57] ABSTRACT

A sealant composition for sealing a can end comprises a mixture of about 15–30 percent by weight of a hydrocarbon resin melting in the range of about 85°–125°C and comprising 100 weight parts of at least one of natural and synthetic rubber and 30 to 120 weight parts of a hydrogenated hydrocarbon resin tackifier prepared by polymerizing a cracked petroleum fraction boiling between −10° and 280°C and containing unsaturated hydrocarbons at least 50 weight percent of which is at least one of aromatic olefins, cyclic olefins and cyclic diolefins, and hydrogenating the resultant polymer to a hydrogenation rate of at least 40 percent; about 1–8 percent by weight of stearic acid; about 0.1–1 percent by weight of butylated hydroxy toluene; about 0.1–1 percent by weight of polyparadinitrosobenzene; about 20–40 percent by weight of paraffin wax; about 1–5 percent by weight of zinc oxide; about 0.25–1 percent by weight of lamp black; about 5–15 percent by weight of titanium dioxide; about 10–30 percent by weight of polyisobutylene; and about 10–20 percent by weight of at least one of butyl rubber, styrene-butadiene rubber and styrene-isoprene rubber.

1 Claim, No Drawings

THERMOPLASTIC CAN END SEALANT COMPOSITION

This invention relates to a sealant composition adapted to be used in sealing a can end of the type used for food and beverages.

In the production of metal cans for packaging food and beverages, the cans can be made in two pieces or in three pieces. A two piece can comprises generally a deep drawn cylinder with a closed end and a can end which is applied in a final operation to close and seal the can after it has been filled with food or beverage. A three piece can comprises generally an open ended cylindrical body shell with separate top and bottom can ends one of which is generally fastened to seal one end prior to filling the same with food or beverage, the other being fastened to close and seal the can after packaging the desired contents therein.

These can ends which can conveniently be fastened to the cylindrical body portion of the can by a double-seaming operation are customarily provided adjacent the periphery of the central panel portion thereof with a trough, the outer edge of which is formed with an inward curl or hook. The trough is provided with a sealant composition. The can body to which the can end is attached is generally provided adjacent the open end thereof with an outwardly turned flange or body hook. In attaching the can end to the can body, the can end is placed in position on the open end of the can body with the sealant composition in the trough fitting on top of the body hook. A conventional double-seaming operation, as well understood in the can art, is then performed causing the can end and body to be distorted to a double seam. In practice, the sealant composition is generally applied in the trough of the can end just after it has been stamped from metal blanks. When a three piece can as discussed above is being produced, the double seams at each end are generally made as identically as possible, using ordinarily the same sealant composition at both ends. The sealant composition, of course, serves to protect the contents of the can from contamination and to retain the contents completely within the can.

Generally the choice of a particular sealant composition can depend upon the nature of the product being packaged although for the most part all such sealant compositions are based on rubber dispersions compounded for performance on high speed equipment. Usually sealant compositions for can ends are classified into two groups, i.e. water-based rubber dispersions and volatile organic solvent-based rubber dispersions, the latter often being subdivided into (a) those which are water-resistant and are utilized in the packaging of fruits, vegetables, beverages and certain pet foods and (b) those which are oil-resistant and are employed in the packaging of fish, poultry, soups and other meat products.

In conventional practice, it has been observed that can ends provided with a water-based rubber dispersion sealant composition are generally subjected to a separate drying operation to remove the water, whereas can ends provided with a volatile organic solvent-based rubber dispersion sealant composition generally dry by themselves through the evaporation of the volatile solvent component while being stored in a work area or in a warehouse, prior to their use.

Thus while can ends provided with a volatile organic solvent-based rubber dispersion sealant composition provide an advantage over the water-based compositions in that a separate drying operation may not be required, nonetheless the use of such volatile organic solvent-based compositions suffers from the disadvantage that the evaporation of large volumes of volatile organic solvents into populated areas where can plants are located causes undesirable air pollution as well as fire and health hazards. In a typical daily operation, approximately 600 drums of such volatile organic solvent-based sealant compositions are employed, the average solvent content thereof being about 60 percent. For instance, one extensively employed volatile organic solvent-based rubber dispersion sealant composition is a hexane dispersion of SBR and/or butyl rubber, compounded with inert fillers, colors, ageing stabilizers, viscosity stabilizers and food grade anti-oxidants. The total solids content of such a sealant composition is about 40%, the remainder being the volatile solvent component.

The use of this sealant composition can thus amount to about 19,800 gallons of volatile organic solvent per day, or just under five million gallons per year based on a 250 day work year, being exhausted to the surrounding atmosphere. Obviously any significant reduction in the emission of such organic solvents to the environment is highly desirable. It has now been found that the use of the sealant composition of the present invention achieves this desideratum.

Thus, in accordance with the present invention, there is provided a sealant composition comprising a mixture of about 15–30 percent by weight of a hydrocarbon resin, melting in the range of about 85°–125°C to control creep in the resulting composition, comprising 100 weight parts of at least one of natural and synthetic rubber and 30 to 120 weight parts of a hydrogenated hydrocarbon resin tackifier prepared by polymerizing a cracked petroleum fraction boiling between −10° and 280°C and containing unsaturated hydrocarbons, at least 50 weight percent of which is at least one of aromatic olefins, cyclic olefins, and cyclic diolefins, and hydrogenating the resulting polymer to a hydrogenation rate of at least 40 percent; about 1–8 percent by weight of stearic acid; about 0.1–1 percent by weight of butylated hydroxy toluene; about 0.1–1 percent by weight of polyparadinitrosobenzene; about 20–40 percent by weight of paraffin wax; about 1–5 percent by weight of zinc oxide; about 0.25–1 percent by weight of lamp black; about 5–15 percent by weight of titanium dioxide; about 10–30 percent by weight of polyisobutylene having a molecular weight ranging from about 1,000 to 6,000; and about 10–20 percent by weight of at least one of butyl rubber, styrene-butadiene rubber and styrene-isoprene rubber, butyl rubber being preferred. When styrene-butadiene rubber is employed it has a Shore A hardness of 60–65, while when styrene-isoprene rubber is utilized it has a Shore A hardness of 35–40.

On a 100% solids basis, the thermoplastic sealant composition of this invention has a specific gravity at 80°F of 0.925, and a maximum viscosity at 350°F of 10,000 cps as measured by the Brookfield LVF Viscometer, No. 4 spindle at 6 rpm.

The hydrogenated hydrocarbon resin tackifier employed herein has a molecular weight between 400–3,000, a softening point between 60° and 150°C and a bromine value less than 30.

In the hydrocarbon resin utilized to produce the sealant composition of this invention, the synthetic rubber component employed can be one of styrene-butadiene rubber, acrylonitrile-butadiene rubber, polyisobutylene rubber, isoprene-isobutylene rubber, chloroprene rubber, silicone rubber, polyvinyl ether and chlorinated rubber. The hydrocarbon resin can be produced in accordance with the procedures set forth in U.S. Pat. No. 3,554,940.

The present invention also relates to a metal container having a service requirement in the temperature range of −20° to 150°F, comprising a metal body portion and at least one metal end closure attached to an end thereof by means of a double seam and a sealant enclosed within said double seam and forming a layer in said seam between said closure and the wall of said metal body portion, said sealant being provided from the sealant composition defined above.

The sealant composition of the present invention can be applied to the trough of the can end so that the sealant flows under the curl or hook in accordance with conventional hot melt procedures. It has been found advantageous in this regard to pre-heat the can end, for instance to a temperature of about 200°–250°F to provide satisfactory flow of the sealant composition under the curl or hook. Preferably, the molten sealant composition is at a temperature of about 350° to 375° when being applied to the can end which can be rotated, for instance, at a rate of about 1500 to 3500 rpm during application of the sealant composition thereto.

A hot melt sealant composition of this invention on a 100% solids basis having the following properties: appearance — gray; solids, 100%; sp.gr at 80°F — 0.925; ash, % — 11.6; viscosity (Brookfield No. 4 spindle at 6 rpm) — 5800 cps at 375°F, 8500 cps at 350°F, and 11,600 cps at 325°F, was applied to a can end heated to 250°F and rotating at 3200 rpm from a hot melt applicator having a nozzle diameter opening of 0.008 inch, the sealant being heated to 375°F and applied under a pressure of 825 psi, to provide a seal which remains sufficiently flexible at −20°F and yet not creep up to a maximum service temperature of 150°F.

What is claimed is:

1. A sealant composition for sealing a can end consisting essentially of a mixture of:
   a. about 15–30 percent by weight of a hydrocarbon resin melting in the range of about 85°–125°C and consisting essentially of 100 weight parts of at least one of natural and synthetic rubber and 30 to 120 weight parts of a hydrogenated hydrocarbon resin tackifier having a molecular weight between 400 – 3,000, a softening point between 60° and 150°C, a bromine value less than 30 prepared by polymerizing a cracked petroleum fraction boiling between −10° and 280°C and containing unsaturated hydrocarbons at least 50 weight percent of which is at least one of aromatic olefins, cyclic olefins and cyclic diolefins, and hydrogenating the resultant polymer to a hydrogenation rate of at least 40 percent,
   b. about 1–8 percent by weight of stearic acid,
   c. about 0.1–1 percent by weight of butylated hydroxy toluene,
   d. about 0.1 – 1 percent by weight of polyparadinitrosobenzene,
   e. about 20 – 40 percent by weight of paraffin wax,
   f. about 1 – 5 percent by weight of zinc oxide,
   g. about 0.25 – 1 percent by weight of lamp black,
   h. about 5 – 15 percent by weight of titanium dioxide,
   i. about 10 – 30 percent by weigh of polyisobutylene, and
   j. at least one further rubber present in amounts additional to that of the rubber present in component (a), said further rubber being selected from butyl rubber, styrene-butadiene rubber having a Shore A hardness of 60 – 65 and styrene-isoprene rubber having a Shore A hardness of 35 – 40, said addition amount being about 10 – 20 percent by weight, said sealant composition on a 100% solids basis, having a specific gravity at 80°F of 0.925, and a maximum viscosity at 350°F of 10,000 cps as measured by the Brookfield LVF Viscometer, No. 4 spindle at 6 rpm.

* * * * *